United States Patent [19]
Albright

[11] 4,240,953
[45] * Dec. 23, 1980

[54] HALOALKYL PHOSPHATES

[75] Inventor: James A. Albright, Ann Arbor, Mich.

[73] Assignee: Velsicol Chemical Corporation, Chicago, Ill.

[ * ] Notice: The portion of the term of this patent subsequent to Apr. 11, 1995, has been disclaimed.

[21] Appl. No.: 820,477

[22] Filed: Aug. 1, 1977

Related U.S. Application Data

[63] Continuation-in-part of Ser. No. 660,672, Feb. 23, 1976, abandoned.

[51] Int. Cl.³ .............................. C08K 5/53; C08F 9/09
[52] U.S. Cl. ............................... 260/45.7 P; 260/963
[58] Field of Search ............ 260/963, DIG. 24, 30.6, 260/45.7 P

[56] References Cited
U.S. PATENT DOCUMENTS

| | | | |
|---|---|---|---|
| 3,046,297 | 7/1962 | Overbeek et al. | 260/963 X |
| 3,132,169 | 5/1964 | Birum et al. | 260/DIG. 24 |
| 3,324,205 | 6/1967 | Carpenter et al. | 260/963 |
| 3,830,886 | 8/1974 | Davis et al. | 260/963 X |
| 3,955,028 | 3/1976 | Weil | 260/963 X |
| 4,046,719 | 9/1977 | Stanaback et al. | 260/963 X |
| 4,083,826 | 4/1978 | Albright | 260/963 X |

FOREIGN PATENT DOCUMENTS 1301734 7/1972 France ...................... 260/963

*Primary Examiner*—John C. Bleutge
*Attorney, Agent, or Firm*—Dietmar Olesch; Robert J. Schwarz

[57] ABSTRACT

Disclosed are haloalkyl phosphates of the generic formula

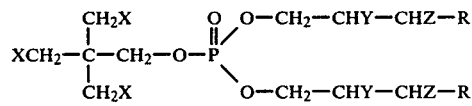

wherein each X is independently selected from chlorine, bromine, and hydrogen, wherein both Ys are identical and selected from chlorine and bromine, wherein each Z is independently selected from chlorine and bromine, and wherein each R is independently selected from hydrogen, alkyl, and halogenated alkyl groups, wherein each alkyl group contains from 1 to about 3 carbon atoms and each halogenated group contains from 1 to about 3 halogen substituents selected from chlorine and bromine.

12 Claims, No Drawings

HALOALKYL PHOSPHATES

SPECIFICATION

This application is a continuation in part of the co-pending application Ser. No. 660,672 filed Feb. 23, 1976 now abandoned.

BACKGROUND OF THE INVENTION

1. Field of the Invention

This invention relates to third degree acyclic esters of phosphorus acid, i.e., compounds containing three P—O—C linkages.

2. Description of the Prior Art

Haloalkyl phosphates are known flame retardants, see U.S. Pat. Nos. 3,132,169; 3,287,266; 3,324,205; and 3,830,886. Commercially known haloalkyl phosphates include tris(bromochloroisopropyl)phosphate, tris (2-chloroethyl)-phosphate, tris(dichloropropyl)phosphate, and tris(2,3-dibromopropyl)phosphate, see 1974–1975 Modern Plastics Encyclopedia, McGraw-Hill Inc., New York, New York, p. 755 et seq. It has been discovered that a sub-generic group of haloalkyl phosphates possesses increased hydrolytic and thermal stability over other haloalkyl phosphates. This improved hydrolytic and thermal stability enables the haloalkyl phosphates of this invention to impart flame retardancy of increased durability to materials treated therewith.

SUMMARY OF THE INVENTION

In accordance with this invention there is provided haloalkyl phosphates of the formula

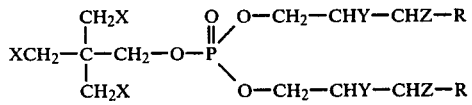

wherein each X is independently selected from the group consisting of chlorine, bromine, and hydrogen, wherein both Ys are identical and selected from chlorine and bromine, wherein each Z is independently selected from chlorine and bromine, and wherein each R is independently selected from the group consisting of hydrogen, alkyl, and halogenated alkyl groups, wherein each alkyl group contains from 1 to about 3 carbon atoms and each halogenated group contains from 1 to about 3 halogen substituents selected from chlorine and bromine. The haloalkyl phosphates of this invention are flame retardants possessing increased hydrolytic and thermal stability.

DESCRIPTION OF THE PREFERRED EMBODIMENTS

The haloalkyl phosphates within the scope of this invention are described by the following formula I:

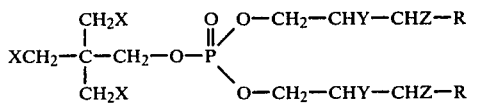

wherein each X is independently selected from the group consisting of chlorine, bromine, and hydrogen, wherein both Ys are identical and selected from chlorine and bromine, wherein each Z is independently selected from chlorine and bromine, and wherein each R is independently selected from the group consisting of hydrogen, alkyl, and halogenated alkyl groups, wherein each alkyl group contains from 1 to about 3 carbon atoms and each halogenated group contains from 1 to 3 halogen substituents selected from chlorine and bromine. Preferably, each R is identical and more preferably each R is hydrogen. It is also preferred that Z be the same halogen as Y. Further, Y is preferably bromine. Each X is preferably independently selected from the group consisting of chlorine and bromine. Exemplary preferred compounds falling within the scope of formula I include bis(2,3-dibromopropyl)-3-bromo-2,2-bis(bromomethyl)propyl phosphate, bis(2,3-dibromopropyl)-3-bromo-2,2-bis(methyl)propyl phosphate, bis(2,3-dibromopropyl)-3-chloro-bis(bromomethyl)propyl phosphate, bis(2,3-dibromopropyl)-3-chloro-2,2-bis(chloromethyl)-propyl phosphate, bis(2,3-dibromopropyl)-3-chloro-2,2-bis(methyl)-propyl phosphate, and bis(2,3-dichloropropyl)-3-chloro-2,2-bis(methyl)propyl phosphate. For purposes of illustration only, Table I as follows is designed to further help describe the compounds of this invention and is neither meant nor should it be taken to be a complete listing of all the compounds within the scope of this invention as described by formula I.

Another preferred embodiment of this invention is the following sub-generic formula II:

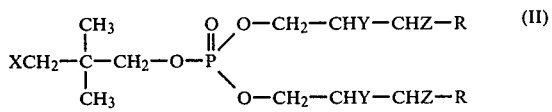

wherein X is chlorine or bromine and wherein Y, Z, and R, as well as their preferred embodiments, are as defined above. Sub-generic formula II is a preferred embodiment of this invention because it combines the increased hydrolytic and thermal stability possessed by the compounds of this invention with a relatively low viscosity to produce a flame retardant compound which is excellent for use in polymeric systems wherein the viscosity of the flame retardant and/or its hydrolytic and/or thermal stability are important factors, e.g., polyurethanes. A relatively low viscosity greatly enhances a flame retardant's ease of handling by enabling said flame retardant to be pumped under less severe conditions of pressure and heat. For halogenated flame retardants of the same thermal stability, the difference in viscosity enables the lower viscosity flame retardant to be handled at a given viscosity while being subjected to less heat, thereby saving energy as well as prolonging the pot life of the polymeric composition containing said lower viscosity flame retardant because the rate at which the flame retardant decomposes is reduced. Further, a lower viscosity flame retardant will also mix more rapidly with a given polymer.

A further preferred embodiment of the present invention resides in the compounds having the following structural formula

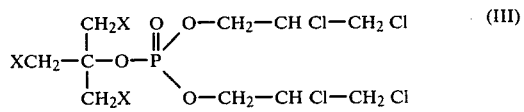

wherein each X is independently selected from the group consisting of chlorine, bromine and hydrogen.

The compounds of this description also possess exceptional light stability and thereby impart fire retardant properties to polymeric compositions without detracting from their light stable properties. Further, the compounds of formula III are less toxic than structurally closely related compounds.

phate prepared by Equation A. The reaction of Equation B can be carried out without isolation or purification of the intermediate chlorophosphate and is generally carried out under the same condition as the first reaction. The resulting phosphates are purified by washing with dilute base to remove the acidic by-pro-

TABLE I

| Compound | X | X | X | Y | Y | Z | Z | R | R |
|---|---|---|---|---|---|---|---|---|---|
| 1 | Br | Br | Br | Br | Br | Br | Br | H | H |
| 2 | Cl | H | H | Br | Br | Br | Br | H | H |
| 3 | Cl | Br | Br | Br | Br | Br | Br | H | H |
| 4 | Cl | Cl | Cl | Br | Br | Br | Br | H | H |
| 5 | Br | Br | H | Br | Br | Br | Br | H | H |
| 6 | Cl | H | H | Cl | Cl | Cl | Cl | H | H |
| 7 | Cl | Cl | Cl | Cl | Cl | Cl | Cl | H | H |
| 8 | Br | Br | Br | Cl | Cl | Br | Br | H | H |
| 9 | Cl | H | H | Cl | Cl | Br | Br | H | H |
| 10 | Cl | Cl | Cl | Cl | Cl | Cl | Br | H | H |
| 11 | Br | Br | Br | Br | Br | Br | Cl | H | H |
| 12 | Br | H | H | Br | Br | Br | Br | H | H |
| 13 | H | H | H | Br | Br | Br | Br | H | H |
| 14 | H | H | H | Cl | Cl | Cl | Cl | H | H |
| 15 | Br | H | H | Cl | Cl | Cl | Cl | H | H |
| 16 | Br | Br | Br | Br | Br | Br | Cl | (CHBr)$_2$CH$_2$Br | CH$_3$ |
| 17 | Cl | H | H | Cl | Cl | Cl | Cl | CH$_2$Cl | CH$_2$Cl |
| 18 | Cl | Br | Br | Br | Br | Br | Br | CHBrCH$_2$Br | CHBrCH$_2$Br |
| 19 | Cl | Cl | Cl | Br | Br | Br | Br | (CHBr)$_2$CH$_2$Br | (CHBr)$_2$CH$_2$Br |
| 20 | Br | Br | H | Br | Br | Br | Br | CH$_2$Br | CH$_2$Br |
| 21 | Cl | Br | Br | Cl | Cl | Cl | Cl | H | H |
| 22 | Br | Br | Br | Cl | Cl | Cl | Cl | H | H |
| 23 | Br | Br | H | Cl | Cl | Cl | Cl | H | H |

The haloalkyl phosphate compounds within the scope of this invention may be prepared according to the following reaction scheme:

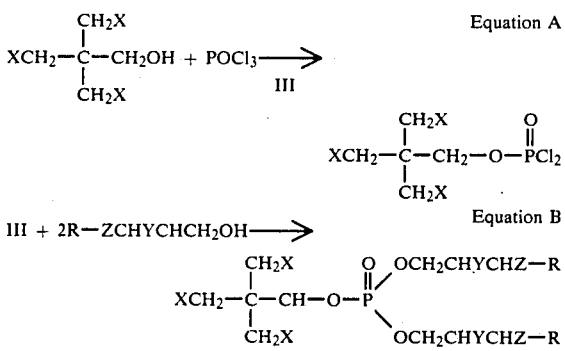

wherein X, Y, Z, and R are as defined above.

More particularly, the reaction of Equation A is generally carried out by the reaction of equimolar quantities of the desired substituted neopentyl alcohol with phosphoryl chloride. The reaction can be carried out at a temperature between 0° to about 150° C. and preferably from about 60° to about 120° C. using a metal salt catalyst, e.g., magnesium oxide, titanium tetrachloride, calcium chloride, magnesium chloride, etc. The reaction can also be carried out using an equimolar quantity of an organic tertiary amine base as a catalyst and hydrogen chloride acceptor, e.g., triethylamine, pyridine, etc. Similarly, reaction of a metal salt of the alcohol with phosphoryl chloride results in the desired products. The reaction is generally carried out from 1 to 48 hours but the time is dependent on the chosen temperature of the reaction. For convenience, reaction times of 1 to 8 hours are generally used.

Also more particularly, the reaction of Equation B is generally carried out by the reaction of 2 moles of appropriately substituted 2-haloalkanol with one mole of the appropriately substituted neopentyl dichlorophosducts, followed by steam distillation to remove volatile by-products. The products are dried, decolorized and filtered.

The compounds of formula I are useful flame retardants in polymeric compositions selected from the group consisting of polyurethane, including flexible and rigid foams and elastomers, polyester, both saturated and unsaturated polyester, and styrene polymers such as polystyrene, including both crystalline and high impact types, and styrene co- and terpolymers such as styrene-butadiene copolymer, styrene-acrylonitrile copolymer and acrylonitrile-butadiene-styrene terpolymers. A further description of above polymers applicable to the present invention may be found in Modern Plastics Encyclopedia, Vol. 52, No. 10A, McGraw-Hill, Inc., New York, N.Y. (1975), said publication being incorporated herein in toto by reference.

It is also contemplated that the flame retardants of formula I will possess excellent flame retardant efficacy in polyolefins, e.g., polypropylene and polyethylene. A detailed description of polyolefin polymers can be found in Modern Plastics Encyclopedia, ibid., said Encyclopedia having been incorporated herein in toto by reference.

The flame retardants of this invention may be incorporated into or applied onto virtually any flammable polyurethane, polyester, and styrene polymeric material by techniques which are standard or known to those skilled in the art. See, for example, J. M. Lyons, "The Chemistry and Uses of Fire Retardants", Wiley-Interscience, New York, N.Y. (1970), and Z. E. Jolles, "Bromine and Its Compounds", Academic Press, New York, N.Y. (1966). Depending on the substrate and the amount of flame retardancy desired, up to about 40 weight percent of the flame retardant compound of formula I within the scope of this invention can be incorporated therewith. However, in most applications it is preferred to use less than 25 weight percent of said compounds within the scope of this invention. It should be noted that the optimum level of additive of the flame retardant I within the scope of this invention depends upon the particular substrate being treated as well as the level of flame retardancy desired. For example, in polyesters a flame retardant level of from about 10 to about 35 percent by weight of the total polymeric composition is satisfactory.

In addition to the flame retardant compounds within the scope of this invention, the flame retardancy of a polymer can be further enhanced through the use of so-called "synergists" or enhancing agents which when used with the compounds of formula I promote a cooperative effect therebetween and thus enhance the flame retardancy of the resultant plastic composition as compared to the flame retardancy of either one component used separately. These "enhancing agents" comprise the oxides and halides of groups IVA and VA of the Periodic Table, i.e., oxides and halides of antimony, bismuth, arsenic, tin, lead, germanium, e.g., antimony oxychloride, antimony chloride, antimony oxide, stannic oxide, stannic chloride, arsenous oxide, arsenous chloride, and the like; and organic and inorganic compounds of phosphorus, nitrogen, boron, and sulfur, e.g., triphenyl phosphate, ammonium phosphate, zinc borate, thiourea, urea, stannic sulfide, and the like and oxides and halides of titanium, vanadium, chromium, manganese, iron, niobium, molybdenum copper, zinc, magnesium, e.g., titanium dioxide, titanium chloride, vanadium pentoxide, chromic bromide, manganous oxide, molybdenum trioxide, ammonium molybdate; and hydrates of the above, i.e., stannic oxide hydrate, lead hydrate; and combinations thereof. The preferred enhancing agents are the oxides of antimony, arsenic and bismuth. However, any compound which on decomposition, as by ignition, yields these oxides would be suitable. Thus some organic antimonates are preferred. The enhancing agents disclosed in U.S. 3,205,196 are also suitable for use.

U.S. Pat. No. 3,205,196, column 2, states that "Antimony oxide is the antimony compound that is presently preferred for use in the present invention. However, many antimony compounds are suitable. Inorganic antimony compounds include antimony sulfide, sodium antimonite, potassium antimonite, and the like. Many organic antimony compounds are suitable such as the antimony salts of organic acids and their pentavalent derivatives disclosed in copending application Ser. No. 688,143, filed Oct. 4, 1957, now U.S. Pat. No. 2,996,528. Compounds of this class include antimony butyrate, antimony valerate, antimony caproate, antimony heptylate, antimony caprylate, antimony pelargonate, antimony caprate, antimony cinnamate, antimony anisate, and their pentavalent dihalide derivatives. Likewise, the esters of antimonous acids and their pentavalent derivatives disclosed in copending application Ser. No. 688,108, filed Oct. 4, 1957, now U.S. Pat. No. 2,993,924, such as tris(n-octyl) antimonite, tris(2-ethylhexyl) antimonite, tribenzyl antimonite, tris($\beta$-chloroethyl) antimonite, tris($\beta$-chloropropyl) antimonite, tris ($\beta$-chlorobutyl) antimonite and their pentavalent compounds are the cyclic antimonites such as trimethylolpropane antimonite, pentaerythritol antimonite, and glycerol antimonite. The corresponding arsenic and bismuth compounds can also be employed."

It is to be understood that such patents as U.S. Pat. Nos. 3,205,196; 2,996,528 and 2,993,924 are to be considered as incorporated herein by reference for all intents and purposes. Without limitation, preferred enhancing agents include $Sb_2O_3$, $SbCl_3$, $SbBr_3$, $SbI_3$, $SbOCl$, $As_2O_3$, $As_2O_5$, $ZnBD_4$, $BaB_2O_4.H_2O$, $2.ZnO.3B_2O_3.3.5\text{-}H_2O$ and stannic oxide hydrate. The more preferred enhancing agent is antimony trioxide.

It is also within the scope of the present invention to employ other materials in the present invention compositions where one so desires to achieve a particular end result. Such materials include, without limitation, adhesion promotors; antioxidants; antistatic agents; antimicrobials; colorants; flame retardants such as those listed on pages 665–668; Modern Plastics Encyclopedia, ibid., (in addition to the new class of flame retardants described herein); heat stabilizers; light stabilizers; pigments; plasticizers; preservatives; ultraviolet stabilizers and fillers.

In this latter category, i.e., fillers, there can be mentioned without limitation, materials such as glass, carbon; cellulosic fillers (wood flour, cork and shell flour); calcium carbonate (chalk, limestone, and precipitated calcium carbonate); metal flakes; metallic oxides (aluminum, beryllium oxide and magnesia); metallic powders (aluminum, bronze, lead, stainless steel and zinc); polymers (comminuted polymers and elastomerplastic blends); silica products (diatomaceous earth, novaculite, quartz, sand, tripoli, fumed colloidal silica, silica aerogel, wet process silica); silicates (asbestos, kaolimite, mica, nepheline syenite, talc, wollastonite, aluminum silicate and calcium silicate); and inorganic compounds such as barium ferrite, barium sulfate, molybdenum disulfide and silicon carbide.

The above mentioned materials, including filler, are more fully described in Modern Plastics Encyclopedia, ibid., and which publication has been incorporated herein in toto by reference.

The amount of the above described materials employed in the present invention compositions can be any quantity which will not substantially adversely affect the desired results derived from the present invention compositions. Thus, the amount used can be any amount up to that percent based on the total weight of the composition at which said composition can still be classified as a plastic. In general, such amount will be from about 0% to about 75% and more specifically from about 1% to about 50%.

The following examples are provided for the purpose of further illustration only and are not intended to be limitations on the disclosed invention. Unless otherwise specified, all temperatures are expressed in degrees centigrade; all weights are expressed in grams; and all volumes are expressed in milliliters.

EXAMPLE 1

Preparation of compound 1 of Table I:

A mixture of 650 grams of tribromoneopentyl alcohol, 307 grams of phosphoryl chloride and 3 grams of magnesium oxide was heated and stirred at 85° to 90° C. for three hours. After cooling overnight, 854 grams of dibromopropanol were added and heated to about 85° C. for six hours. After aspirating at 95° C. for 0.5 hours, the product was washed three times with an aqueous ammonia solution having a pH of 8 and a temperature of 50° C. The volatile by-products were removed by steam distillation and the product was dried, treated with celite and celkate and filtered. A yield of 1200 grams (74%) of a viscous liquid was obtained. Analysis: Calculated for $C_{11}H_{18}Br_7O_4P$: Br, 69.48. Found: Br, 69.03.

EXAMPLE 2

Preparation of compound 3 of Table I:

A mixture containing 872 grams of 3-chloro-2,2-bis(-bromomethyl)propyl dichlorophosphate and 900 grams of 2,3-dibromopropanol was heated to about 85° C. and allowed to react at that temperature for about six hours. After aspirating at 95° C. for 0.5 hours, the product was washed three times with an aqueous ammonia solution having a pH of 8 and a temperature of 60° C. The volatile by-products were removed by steam distillation and the product was dried, treated with celite and celkate, and filtered. A yield of 1308 grams of a viscous liquid was obtained. Analysis: Calculated for $C_{11}H_{16}Br_6ClO_4P$: Br, 63.4; Cl, 4.69. Found: Br, 62.24; Cl, 5.60.

EXAMPLE 3

Compound 2 of Table I was prepared in a manner similar to Example 2, except that 1400 g of 3-chloro-2,2-di(methyl)propyl dichlorophosphate was reacted with 2478 g of 2,3-dibromopropanol to yield 2355 g of a low viscosity liquid. Analysis: Calculated for $C_{11}H_{20}Br_4ClO_4P$: Br, 53.1; Cl, 5.90. Found: Br, 51.0; Cl, 7.08.

EXAMPLE 4

Compound 4 of Table I was prepared in a manner similar to Example 2, except that 234 g of tris-2,2,2-(chloromethyl)ethyl dichlorophosphate was reacted with 305 g of 2,3-dibromopropanol to yield 366 g of a viscous liquid. Analysis: Calculated for $C_{11}H_{18}Br_4Cl_3O_4P$: Br, 47.6; Cl, 15.9. Found: Br, 47.72; Cl, 16.27.

Bis(2,3-dibromopropyl)-3-bromo-2,2-bis(methyl)propyl phosphate and bis(2,3-dichloropropyl)-3-chloro-2,2-bis(methyl)propyl phosphate as well as other compounds within the scope of formula I can be prepared in a manner similar to that employed in examples 1 through 4.

EXAMPLE 5

A test, hereinafter referred to as the Hydrolytic Stability Test (HST), has been devised to quantitatively measure the hydrolytic stability of compounds. As applied to the compounds under consideration, the HST measures the extent to which the following reaction proceeds:

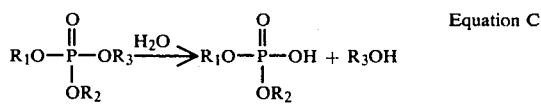

Equation C wherein $R_1$, $R_2$ and $R_3$ are independently selected from halogenated or unhalogenated carbon containing groups. The acid or Hydrolytic Stability Test Number (HST Number) is directly proportional to a compound's hydrolytic instability.

In particular, a magnetically stirred emulsion containing 4 grams of compound 1 of Table I, 1 gram of an emulsifier (Emcol AM210C, Witco Chemical Corporation, Organics Division, New York, N.Y.), and 45 grams of water was heated at 100° C. for 44 hours. (The emulsifier is used merely for the purpose of obtaining a uniform emulsion of two otherwise immiscible liquids.) The HST Number of the emulsion as determined by titration with a standard potassium hydroxide solution was 1.81.

Using the HST described in Example 5, the hydrolytic stability of triethyl phosphate, bis(bromopropyl)chloroethyl phosphate, tris(2-chloroethyl)phosphate, tris(2,3-dibromoprogropyl)phosphate, and compound 2 of Table I was also determined. The HST Numbers for these compounds are listed in Table II.

As exemplified by bis(2,3-dibromopropyl)-3-chloro-2,2-bis-(methyl)propyl phosphate and bis(2,3-dibromopropyl)-3-bromo-2,2-bis(bromomethyl)propyl phosphate in Table II, the hydrolytic stability of the narrow sub-generic group of compounds within the scope of this invention, e.g., bis(2,3-dibromopropyl)-3-bromo-2,2-bis-(methyl)propyl phosphate, bis(2,3-dibromopropyl)-3-chloro-bis-(bromomethyl)propyl phosphate, bis(2,3-dibromopropyl)-3-chloro-2,2-bis(chloromethyl)-propyl phosphate, and bis(2,3-dichloropropyl)-3-chloro-2,2-bis(methyl)propyl phosphate, is unobviously better than the hydrolytic stability of close prior art compounds. This increase in hydrolytic stability possessed by the compounds within the scope of this invention has significant commercial implications as is disclosed by the following examples.

TABLE II

| Compound | HST Number (mg KOH/g Sample) |
| --- | --- |
| Triethyl phosphate | 17.2 |
| Bis(bromopropyl)chloroethyl phosphate | 9.72 |
| Tris(2-chloroethyl)phosphate | 8.7 |
| Tris(2,3-dibromopropyl) phosphate | 3.2 |
| Compound 2 of Table I | 1.85 |
| Compound 1 of Table I | 1.81 |

EXAMPLE 6

Two flame retardant emulsions were prepared. The components of each emulsion and weight percent of each component are listed in Table III.

TABLE III

| Component | Emulsion X | Emulsion Y |
| --- | --- | --- |
| Water | 60.0 | 60.0 |
| Emulsion Concentrate | 40.0 | 40.0 |
| Compound 3, Table I | 50.0 | — |
| Bis(bromopropyl) chloroethyl phosphate | — | 50.0 |
| Solvent[a] | 40.0 | 40.0 |
| Emulsifying Agent[b] | 10.0 | 10.0 |

[a]The solvent had a flash point of about 110° F. and a boiling point of about 315° F. (Hi-Sol 10 brand solvent, Ashland Chemical Company, Columbus, Ohio)
[b]The emulsifying agent was an anionic blend of oil-soluble metal sulfonates with polyoxyethylene ethers having an HLB value of 12.5. (Emcol N-141 brand emulsifying agent, Witco Chemical Co., Inc., Chicago, Illinois).

Two sets of samples of 100% polyester fabrics (Style Number 755H, 100% Spun Dacron 54, 36×32 count, 20/2 yarn size, 5.2 ounces per square yard, Testfabrics, Inc., Middlesex, N.J.) were treated with the above emulsions. The processes to which the two sets of samples were subjected as well as the data obtained from said samples are listed in Table IV.

TABLE IV

| Emulsion | Wet Pick Up, Percent | Processing | | | $Br_2$[d] Count | $O_2$[e] Index |
| --- | --- | --- | --- | --- | --- | --- |
| | | Dry[a] | Cure[b] | AW[c] | | |
| X | 72.0 | X | | | 14,012 | |
| X | 72.0 | X | X | | 15,836 | |

TABLE IV-continued

| Emulsion | Wet Pick Up, Percent | Processing Dry[a] | Cure[b] | AW[c] | Br$_2$[d] Count | O$_2$[e] Index |
|---|---|---|---|---|---|---|
| X | 72.0 | X | X | X | 15,268 | 30.0 |
| Y | 64.7 | X | | | 11,086 | |
| Y | 64.7 | X | X[f] | | 2,552 | |
| Y | 64.7 | X | X[f] | X | 1,163 | 22.5 |
| Control | — | — | — | — | — | 22.5 |

[a]Dry: 5 minutes at 110° C.
[b]Cure: 90 seconds at 205° C.
[c]Afterwash: 40 grams of soda ash and 20 grams of Triton QS-44 detergent (Triton QS-44 is a trademark of Rohm and Haas Company, Philadelphia, Pennsylvania) were used with a Kenmore 600 washing machine on a delicate cycle, hot water (71° C.), and warm rinse setting. The samples were tumbled dried.
[d]Bromine count was obtained by the use of a fluorescent x-ray technique. When measuring the bromine content of identical fabric substrates as was the case herein, the bromine count is a relative number indicative of the bromine content of the fabric sample. This bromine count technique is basically a linear relation wherein the higher the bromine count the higher the bromine content of the fabric sample.
[e]Oxygen Index: ASTM D 2863-70.
[f]Observation: Tremendous fumes came out during and after the curing.

Table IV clearly indicates that the thermal stability of a flame retarding agent is decisive in the durability of a given flame retardant finish. The two emulsions contrasted in Table IV differ from each other solely in the flame retarding agent employed. Emulsion Y which employed a prior art flame retarding agent severely decomposed during the curing procedure, as evidenced by the bromine count as well as the tremendous amount of fumes observed during said procedure, and much of the emulsion finish was also removed during the afterwash step. Both of these phenomena are directly related to the relatively poor hydrolytic and thermal stability of the prior art flame retarding agent, bis(bromopropyl)-chloroethyl phosphate, employed in Emulsion Y. In contrast, fabrics treated with Emulsion X containing a flame retarding agent within the scope of this invention maintained their bromine count throughout the drying, curing, and afterwash procedures. This stability of Emulsion X is due to the increased hydrolytic and thermal stability of the compounds within the scope of this invention. The superior oxygen index of the fabric treated with Emulsion X containing an exemplary flame retardant compound within the scope of this invention over the fabric treated with Emulsion Y containing a prior art flame retardant further exemplifies the commercial importance of the increased hydrolytically and thermally stable compounds within the scope of this invention.

EXAMPLE 7

A solution of 600 grams of polystyrene and 10 parts per hundred resin (phr) of compound 3 of Table I in 2670 grams of methylene chloride and 60 grams of hexane was prepared. To the above solution was added 3 grams of dicumyl peroxide as a flame retardant synergist. This mixture was poured into an aluminum dish and the methylene chloride was allowed to evaporate in the air. Following this, the casting was steamed to produce a crude foam. This foam was then cut into sufficient specimens of appropriate sizes in order to subject said foam to three tests capable of measuring the nonflammability of said foam. The flammability tests to which the foam specimens were subjected consisted of the Underwriters' Laboratories, Inc.'s UL-94 Standard for Safety (UL-94), ASTM D 2863-70 Oxygen Index Test (OI), and an ignition test (described below). The first two of the above tests are well known to those skilled in the art of flame retardants and therefore no elaboration on or summary of said tests is made herein.

The ignition test entailed holding a foamed specimen in a vertical position and igniting said specimen for a second or so with a micro burner. To pass this ignition test the ignited foamed specimen upon removal of the ignition source, should cease burning in one second or less. The results obtained by subjecting the foamed specimens to the several flammability tests are listed in Table V.

Additional samples of polymer were prepared in which the amount of fire retardant was 2.5 phr and 5 phr. Still additional samples were prepared with the prior art compound tris(2,3-dibromopropyl)phosphate at the 2.5, 5 and 10 phr levels. These samples were tested in the same manner and the results obtained are also tabulated in Table V.

TABLE V

| Flame Retardant | phr | OI | UL-94 | Ignition Test |
|---|---|---|---|---|
| Compound 3, Table I | 10 | 30.1 | V-0 | Pass |
| " | 5 | 28.5 | V-0 | Pass |
| " | 2.5 | 25.5 | V-2 | Pass |
| Prior Art | | | | |
| Tris(2,3-dibromo-propyl)phosphate | 10 | 33.0 | V-0 | Pass |
| Tris(2,3-dibromo-propyl)phosphate | 5 | 29.5 | V-0 | Pass |
| Tris(2,3-dibromo-propyl)phosphate | 2.5 | 28.0 | V-2 | Pass |

As exemplified by bis(2,3-dibromopropyl)-3-chloro-2,2-bis-(bromomethyl)propyl phosphate in Table V, the flame retardants of this invention, e.g., bis(2,3-dibromorpopyl)-3-bromo-2,2-bis(bromomethyl)propyl phosphate, bis(2,3-dibromopropyl)-3-bromo-2,2-bis-(methyl)propyl phosphate, bis(2,3-dibromopropyl)-3-chloro-2,2-bis-(chloromethyl)propyl phosphate, bis(2,3-dibromopropyl)-3-chloro-2,2-bis(methyl)propyl phosphate, and bis(2,3-dichloropropyl)-3-chloro-2,2-bis(methyl)propyl phosphate, possess a flame retardant efficacy comparable to that of tris(2,3-dibromopropyl)phosphate. However, it is known that the polymerization of styrene beads via a suspension system is a sensitive procedure. "The stability of the suspension system depends upon the selection of the suspending agent, the degree of agitation, the surface tension of the water, the parameter of the kettle, the condition of the water that is charged initially to the process, and many other factors, such as the time and the temperature in the reaction conditions. Because of all these variables, the stability of the suspension system is extremely important, not just for successful operation of the suspension system without failure and coalescence but also to guarantee an effective beadsize distribution of the final product which emerges from the kettles." R. B. Bishop, "Practical Polymerization for Polystyrene," 266, Cahners Books, Boston, Massachusetts 02116, 1971. The hydrolytic and thermal stability of flame retardant compounds is a variable which can adversely affect the stability of the suspension system. The higher a compound's HST Number, the more hydrolytically unstable that compound is and the more acidic and corrosive would be a solution or suspension containing said compound. This increase in acidity detrimentally affects the stability of the styrene suspension system; and because of its corrosive properties, decreases the useful life of process equipment. Therefore, the flame retardants within the scope of this invention intorduce into the styrene suspension system more hydrolytically stable flame retardants thereby better assuring the stability of said styrene suspension system while maintaining the flame retardant efficacy of prior art flame retardants.

The following examples exemplify other embodiments using compounds within the scope of this invention wherein the hydrolytic stability of said compounds makes a significant commercial difference.

EXAMPLE 8

The foam was prepared using the following basic formulation:

| Component | Parts by Weight |
| --- | --- |
| Polyol[a] | 100 |
| Silicone Glycol[b] Surfactant | 2 |
| Trichlorofluoromethane[c] | 35 |
| Polyisocyanate[d] | 135 |

[a]alkanolamine polyol, molecular weight approximately 3500, hydroxyl number approximately 530, Thanol R-350-X, Jefferson Chemical Co., Houston, Texas.
[b]Dow Corning 193, Dow Corning Corp., Midland, MI.
[c]Freon 11B, E. I. DuPont de Nemours & Co., Wilmington, Del.
[d]Polymeric aromatic isocyanate, 31.5% available NCO, Mondur MRS, Mobay Chemical Co., Pittsburgh, PA.

The polyol, surfactant, and fluorocarbon blowing agent were combined in a masterbatch based on 1000 g of polyol to minimize loss of blowing agent.

The following procedure was used to prepare the foam:
1. The polyisocyanate was weighed into a tared, 10 ounce, paper cup (allowances being made for hold-up) and the cup set aside while the remaining ingredients were weighed out and mixed.
2. The polyol masterbatch was weighed out, in the proper amount to give 100 grams of polyol, in a one quart, untreated, paper cup.
3. The 10 grams of Compound 3 of Table I were then weighed into the same one quart cup.
4. The contents of the one quart cup were mixed at 1000 rpm for 5 seconds.
5. The polisocyanate was then added and stirring at 1000 rpm continued for 10 seconds.
6. The mix was poured into a 5 pound, untreated, paper tub and allowed to rise.

After the foam was tack-free, and substantially cured, it was set aside for at least seven days before cutting the foam in half to observe the extent of "scorch" (discoloration) at the center. These observations are recorded in Table VI.

Using the same procedure other foams were made at different load levels as well as containing different flame retardant additives. The results of these additional tests are also reported in Table VI.

TABLE VI

| Flame Retardant | phr | Scorch | OI |
| --- | --- | --- | --- |
| (control) | — | None Detected | 20.5 |
| Compound 5, Table I | 10 | None Detected | 23.5 |
| " | 20 | None Detected | 25.5 |
| " | 30 | None Detected | 26.5 |
| Compound 6, Table I | 10 | None Detected | 22.5 |
| " | 20 | None Detected | 23.5 |
| " | 30 | None Detected | 24.5 |
| (Prior Art) | | | |
| tris(2,3-dibromopropyl)phosphate | 10 | Pronounced Scorch | 23.5 |
| tris(2,3-dibromopropyl)phosphate | 20 | Pronounced Scorch | 25.5 |
| tris(2,3-dibromopropyl)phosphate | 30 | Pronounced Scorch | 26.5 |

The presence of scorch is detrimental for basically three reasons. First, scorch is not aesthetic in appearance and is therefore a very undesirable property in foams whose ultimate application necessitates their use as cuttings. Second, industrial manufacturers fear the presence of discoloration in the center of rigid polyurethane foams because at one time said discoloration was an indication that excessive heat was being generated inside the foam during the manufacturing process which could possibly result in the ignition of the rigid foams. Third, the presence of scorch is felt to be an indication of the decomposition of the flame retardant additives which decomposition detrimentally affects the physical properties of the foam.

EXAMPLE 9

Type I toluene diisocyanate (hereinafter referred to as TDI) was placed in a first tank of a Martin Sweets Modern Module No. 3A urethane foam equipment modified for six components. Compound 2 of Table I (1 kg) was mixed with 10 kg of Pluracol GP 3030 polyol in a second tank. (Pluracol GP 3030 brand polyol, BASF Wyandotte, Wyandotte, MI, is a polypropylene glycol having a molecular weight of approximately 3000 and a hydroxyl number of approximately 56.) Stannous octoate catalyst was placed in a third tank (T-9 brand catalyst, M & T Chemicals, Inc., New York, NY). Into a fourth tank was placed a silicone surfactant (L-540 brand silicone surfactant, Union Carbide Corp., New York, N.Y.). A water-triethylene diamine mixture (3/0.45) was added to a fifth tank. (Dabco 33LV brand triethylene diamine, Houndry Process & Chemical Co., is a 33% solution of triethylene diamine in dipropylene glycol.) All the above components were simultaneously mixed using a size 3 pin type mixer at 3,000 rmp in the following ratio:

| Component | Parts by Weight |
| --- | --- |
| Compound 2, Table I | 10 |
| Polyol | 100 |
| TDI | 39.3 |
| Stannous Octoate | 0.16 |
| Silicone surfactant | 1.0 |
| Water | 3.0 |
| Triethylene diamine | 0.45 |

The mixture was dropped during the mixing procedure into a 14"×14"×6" Adstrom cardboard box. After the foam came to full height it was post cured in a forced air oven at 99° to 104° C. for 30 minutes.

After allowing the foam to sit for at least 7 days, the foam was then subjected to ASTM D 1564 Compression Set Method B-1971. The data obtained from this test is reported in Table IX.

The same procedure was used to make other foams at different load levels. Those foams were also subjected to the Compression Set Test and the data obtained reported in Table VII.

TABLE VII

| Flame Retardant | phr | 90% Compression Set[a] (Parallel Rise) | |
|---|---|---|---|
| | | $C_t^b$ | $C_d^c$ |
| Control | — | 6.98 | 7.75 |
| Compound 2, Table I | 10 | 4.23 | 4.70 |
| " | 20 | 14.9 | 16.5 |

[a]ASTM D-1564-1971 - Compression Set Test Method B
[b]$C_t$ is the compression set expressed as a percent of the original thickness
[c]$C_d$ is the compression set expressed as a percent of the original deflection.

The higher the compression set number the poorer on the physical properties of the foam. Further, in order to pass ASTM D-1564 Compression Set Test Method B, a foam has to display a compression set number less than 20 percent. Therefore, as Table VII indicates, Compound 2 of Table I passes the ASTM test.

Other flame retardants within the scope of this invention, e.g., bis(2,3-dibromopropyl)-3-bromo-2,2-bis(bromomethyl)propyl phosphate, bis(2,3-dibromopropyl)-3-bromo-2,2-bis(methyl)propyl phosphate, bis(2,3-dibromopropyl)-3-chloro-bis(bromomethyl)propyl phosphate, bis(2,3-dibromopropyl)-3-chloro-2,2-bis(chloromethyl)-propyl phosphate, bis(2,3-dibromopropyl)-3-chloro-2,2-bis(methyl)-propyl phosphate, and bis(2,3-dichloropropyl)-3-chloro-2,2-bis-(methyl)propyl phosphate, also possess excellent flame retardant efficacy in polyurethane, polyester, and styrene polymeric compositions.

EXAMPLE 10

Using the exact procedure of Example III of U.S. Pat. No. 3,830,886, a compound was produced which is disclosed in said Example 3 to be 3-bromo-2,2-bis(hydroxymethyl)propyl diethyl phosphate of the formula

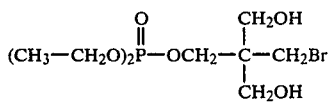

The viscosity of 3-bromo-2,2-bis(hydroxymethyl)propyl diethyl phosphate was determined at 28° C. using a Brookfield Viscosimeter. In the same manner the viscosity of Compound 2 of Table I was determined and the results are listed in Table VIII. Also listed in Table VIII is the viscosity of tris(2,3-dibromopropyl)phosphate, another prior art flame retardant.

TABLE VIII

| | Viscosity Centipoise | Viscosity Increase Over Compound 2, Table I (Percent) |
|---|---|---|
| 3-bromo-2,2-bis-(hydroxymethyl)propyl diethyl phosphate | 9450 | 497 |
| tris(2,3-dibromopropyl)phosphate | 7500 | 395 |
| Compound 2, Table I | 1900 | |

As exemplified by bis(2,3-dibromopropyl)-3-chloro-2,2-bis-(methyl)propyl phosphate, in Table VIII, compounds within the scope of formula II, e.g., bis(2,3-dibromopropyl)-3-bromo-2,2-bis(methyl)-propyl phosphate and bis(2,3-dichloropropyl)-3-chloro-2,2-bis-(methyl)propyl phosphate, possess a viscosity which is unobviously low in view of the prior art. This substantial decrease in the viscosity of formula II compounds has significant commercial implications in both flexible and rigid polyurethane forms as well as in any polymeric system wherein viscosity is a factor to be taken into consideration. The relatively low viscosity of compounds within the scope of formula II greatly enhances their ease of handling by enabling said flame retardants to be pumped under less severe conditions of pressure and heat. For halogenated flame retardants of the same thermal stability, the difference in viscosity enables the lower viscosity flame retardants within the scope of formula II of this invention to be handled at a given viscosity while being subjected to less heat, thereby saving energy as well as prolonging the pot life of the polymeric composition containing a polymer and said lower viscosity flame retardants because the rate at which the flame retardant breaks apart is reduced. Further, the lower viscosity flame retardants within the scope of formula II of this invention will also mix more rapidly with a given polymer.

EXAMPLE 11

The thermal stability of compound 4 of Table I, tris(2-chloroethyl)phosphate, and tris(2,3-dibromopropyl)phosphate was determined by the procedure set forth in Section 9-951, "Thermogravimetric Analyzer", of "Instruction Manual 990, Thermal Analyzer and Modules", E. I. Du Pont De Nemours and Co. (Inc.), Instrument Products Division, Wilmington, Delaware 19898. The results of the thermogravimetric analysis (TGA) of the three compounds at several different weight losses are tabulated in Table IX as follows:

TABLE IX

| | TGA RESULTS | | |
|---|---|---|---|
| | Temperature at which weight Change Occurs, °C. | | |
| Compound | 10% wt. Loss | 25% wt. Loss | 50% wt. Loss |
| Compound 4, Table I | 285 | 307 | 323 |
| Tris(2-chloroethyl)phosphate | 182 | 197 | 209 |
| Tris(2,3-dibromopropyl)phosphate | 273 | 288 | 307 |

As exemplified by bis(2,3-dibromopropyl)-3-chloro-2,2-bis-(chloromethyl)propyl phosphate, in Table IX, compounds within the scope of this invention, e.g., bis(2,3-dibromopropyl)-3-bromo-2,2-bis(bromomethyl)-propyl phosphate, bis(2,3-dibromopropyl)-3-bromo-2,2-bis(methyl)propyl phosphate, bis(2,3-dibromopropyl)-3-chloro-bis(bromomethyl)propyl phosphate, bis(2,3-dibromopropyl)-3-chloro-2,2-bis(methyl)propyl phosphate, and bis(2,3-dichloropropyl)-3-chloro-2,2-bis(methyl)propyl phosphate, possess superior thermal stability than that possessed by prior art compounds.

Based on this disclosure many other modifications and ramifications will naturally suggest themselves to those skilled in the art. These are intended to be comprehended as within the scope of this invention.

What is claimed is:
1. A compound of the formula

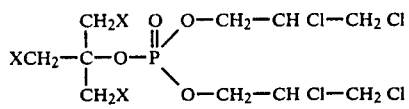

wherein each X is independently selected from the group consisting of chlorine, bromine and hydrogen.

2. The compound of claim 1, bis(2,3-dichloropropyl)-3-chloro-2,2-bis(methyl)propyl phosphate.

3. The compound of claim 1, bis(2,3-dichloropropyl)-3-chloro-2,2-bis(bromomethyl)propyl phosphate.

4. The compound of claim 1, bis(2,3-dichloropropyl)-3-bromo-2,2-bis(bromomethyl)propyl phosphate.

5. The compound of claim 1, bis(2,3-dichloropropyl)-3-chloro-2,2-bis(bromomethyl)propyl phosphate 6. The compound of claim 1, bis(2,3-dichloropropyl) 3-chloro-2,2-bis(chloromethyl)propyl phosphate.

7. A polymeric composition comprising a polymer selected from the group consisting of polyurethane, polyester and polystyrene and a flame retarding amount of a compound of claim 1.

8. The polymeric composition of claim 7 wherein the polymer is a polyurethane.

9. The polymeric composition of claim 7 wherein the polymer is a polyester.

10. The polymeric composition of claim 7 wherein the polymer is a polystyrene.

11. A haloalkyl phosphate of the formula

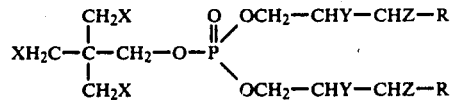

wherein each X is independently selected from the group consisting of chlorine, bromine, and hydrogen; wherein both Ys are identical and are selected from the group consisting of chlorine and bromine; wherein each Z is independently selected from chlorine and bromine; and wherein each R is independently selected from the group consisting of hydrogen, alkyl of from 1 to about 3 carbon atoms, and haloalkyl having from 1 to about 3 carbon atoms and from 1 to about 3 halogen substituents selected from the group consisting of chlorine and bromine.

12. A polymeric composition comprising a polymer selected from the group consisting of polyurethane, polyester, and styrene polymers and a flame retarding amount of the haloalkyl phosphate of claim 11.

* * * * *